United States Patent
Batra et al.

(10) Patent No.: US 10,154,384 B2
(45) Date of Patent: Dec. 11, 2018

(54) SYSTEMS AND METHODS FOR BACK CHANNEL COMMUNICATION

(71) Applicant: QUALCOMM Incorporated, San Diego, CA (US)

(72) Inventors: Mayank Batra, Cambridge (GB); Brian Redding, Urbana, IL (US); Robin Heydon, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 15/190,079

(22) Filed: Jun. 22, 2016

(65) Prior Publication Data

US 2017/0374533 A1 Dec. 28, 2017

(51) Int. Cl.
| | |
|---|---|
| H04W 4/06 | (2009.01) |
| H04W 4/80 | (2018.01) |
| H04L 1/16 | (2006.01) |
| H04W 8/00 | (2009.01) |
| H04W 74/08 | (2009.01) |
| H04W 84/20 | (2009.01) |
| H04L 1/00 | (2006.01) |

(52) U.S. Cl.
CPC ............... *H04W 4/06* (2013.01); *H04L 1/16* (2013.01); *H04W 4/80* (2018.02); *H04W 8/005* (2013.01); *H04W 74/08* (2013.01); *H04L 2001/0093* (2013.01); *H04W 84/20* (2013.01)

(58) Field of Classification Search
CPC ....... H04W 4/06; H04W 4/008; H04W 8/005; H04W 74/08; H04W 84/20; H04L 1/16
USPC .......................................................... 370/312
See application file for complete search history.

(56) References Cited

U.S. PATENT DOCUMENTS

| | | | |
|---|---|---|---|
| 8,879,993 B2 | 11/2014 | Palin et al. | |
| 2004/0082343 A1 | 4/2004 | Kim et al. | |
| 2004/0103275 A1* | 5/2004 | Ji ............................. | H04L 45/54 713/150 |
| 2004/0136338 A1* | 7/2004 | Lin ........................ | H04W 84/18 370/329 |
| 2006/0206783 A1* | 9/2006 | Nishihara ............. | H04L 1/1614 714/776 |
| 2013/0322277 A1* | 12/2013 | Vanganuru ............ | H04W 24/08 370/252 |

(Continued)

FOREIGN PATENT DOCUMENTS

EP 1133094 A2 9/2001

OTHER PUBLICATIONS

Bisdikian C., "An Overview of the Bluetooth Wireless Technology," In-Home Networking, IEEE Communications Magazine, Dec. 2001, pp. 86-94.

(Continued)

*Primary Examiner* — Stephen J Clawson
(74) *Attorney, Agent, or Firm* — Austin Rapp

(57) ABSTRACT

A method for communication by a scanner is described. The method includes receiving a broadcast message from a broadcasting device in a connectionless mode. The method also includes performing back channel communication with the broadcasting device on a contention basis while maintaining the connectionless mode. The scanner may send a packet to the broadcasting device while maintaining a connectionless relationship with the broadcasting device.

26 Claims, 10 Drawing Sheets

(56) References Cited

U.S. PATENT DOCUMENTS

2015/0289124 A1 10/2015 Palin et al.
2015/0365940 A1 12/2015 Chu et al.

OTHER PUBLICATIONS

Jang K., et al., "Reliable Delivery of Broadcast Packet in Bluetooth," IEEE VTS 53rd Vehicular Technology Conference, 2001, vol. 2, pp. 1119-1123.
Bluetooth Special Interest Group: "Specification of the Bluetooth System—Core Package 4.1", Dec. 3, 2013, XP055388575, Retrieved from the Internet: URL: Specification of bluetooth System-Master Table of Con https://www.bluetooth.org/DocMan/handlers/DownloadDoc.ashx?doc id=282159 [retrieved on Jul. 6, 2017], pp. 1-2684.
International Search Report and Written Opinion—PCT/US2017/029135—ISA/EPO—dated Jul. 20, 2017.

\* cited by examiner

SYSTEMS AND METHODS FOR BACK CHANNEL COMMUNICATION

TECHNICAL FIELD

The present disclosure relates generally to communications. More specifically, the present disclosure relates to systems and methods for back channel communication.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or more reliably are often sought after.

Some electronic devices communicate with other electronic devices. These electronic devices may transmit and/or receive electromagnetic signals. For example, a smartphone may transmit signals to and/or receive signals from another device (e.g., a laptop computer, an electronics console in a vehicle, a wireless headset, etc.). In another example, a wireless headset may transmit signals to and/or receive signals from another device (e.g., a laptop computer, a game console, a smartphone, etc.).

In some scenarios, an electronic device may broadcast a message. It may be desirable to broadcast the message from the broadcasting device without being limited to a certain number of receiving devices (referred to herein as scanners). To this end, the broadcasting device may operate in a connectionless mode with respect to the scanners. However, back channel communication from a scanner back to the broadcasting device may provide useful information to the broadcasting device. As can be observed from this discussion, systems and methods for back channel communication while maintaining a connectionless mode may be beneficial.

SUMMARY

A method for communication by a scanner is described. The method includes receiving a broadcast message from a broadcasting device in a connectionless mode. The method also includes performing back channel communication with the broadcasting device on a contention basis while maintaining the connectionless mode.

The back channel communication may occur following a Bluetooth low energy (BLE) periodic advertising by the broadcasting device. Alternatively, the back channel communication may occur following a Bluetooth connectionless slave broadcast (CSB) instant. The scanner may send a packet to the broadcasting device in a slave-to-master slot following a master-to-slave transmission.

Performing back channel communication in the connectionless mode may occur without initiating a connection setup procedure with the broadcasting device. A packet may be sent to the broadcasting device without attempting to establish a point-to-point asynchronous connection-less (ACL) connection. The scanner may send a packet to the broadcasting device while maintaining a connectionless relationship with the broadcasting device.

Performing back channel communication may include sending a packet with a scanner address. The broadcasting device may identify the scanner with the scanner address.

The method may also include receiving a broadcast acknowledgment (ACK) message from the broadcasting device when the broadcasting device successfully receives a packet sent in the back channel communication. The method may further include receiving a broadcast negative acknowledgment (NACK) message from the broadcasting device when the broadcasting device fails to successfully receive a packet sent in the back channel communication.

A scanner is also described. The scanner includes a processor, a memory in electronic communication with the processor and instructions stored in the memory. The instructions are executable by the processor to receive a broadcast message from a broadcasting device in a connectionless mode. The instructions are also executable to perform back channel communication with the broadcasting device on a contention basis while maintaining the connectionless mode.

A method for communication by a broadcasting device is also described. The method includes sending a broadcast message from the broadcasting device in a connectionless mode. The method also includes receiving a back channel communication from a scanner on a contention basis while maintaining the connectionless mode with respect to the scanner.

The back channel communication may be received following a BLE periodic advertising by the broadcasting device. Alternatively, the back channel communication may be received following a Bluetooth CSB instant. The scanner may send a packet to the broadcasting device in a slave-to-master slot following a master-to-slave transmission.

The back channel communication may be received without initiating a connection setup procedure with the broadcasting device. Receiving the back channel communication in the connectionless mode may include receiving a packet from the scanner without attempting to establish a point-to-point ACL connection. The broadcasting device may receive a packet from the scanner while maintaining a connectionless relationship with the scanner.

Receiving the back channel communication may include receiving a packet with a scanner address. The scanner may be identified based on the scanner address.

The method may also include sending a broadcast ACK message addressed to the scanner when the broadcasting device successfully receives a packet in the back channel communication. The method may also include sending a broadcast NACK message to the scanner when the broadcasting device fails to successfully receive a packet in the back channel communication.

A broadcasting device is also described. The broadcasting device includes a processor, a memory in electronic communication with the processor and instructions stored in the memory. The instructions are executable by the processor to send a broadcast message from the broadcasting device in a connectionless mode. The instructions are also executable to receive a back channel communication from a scanner on a contention basis while maintaining the connectionless mode with respect to the scanner.

DETAILED DESCRIPTION

Figure 1:
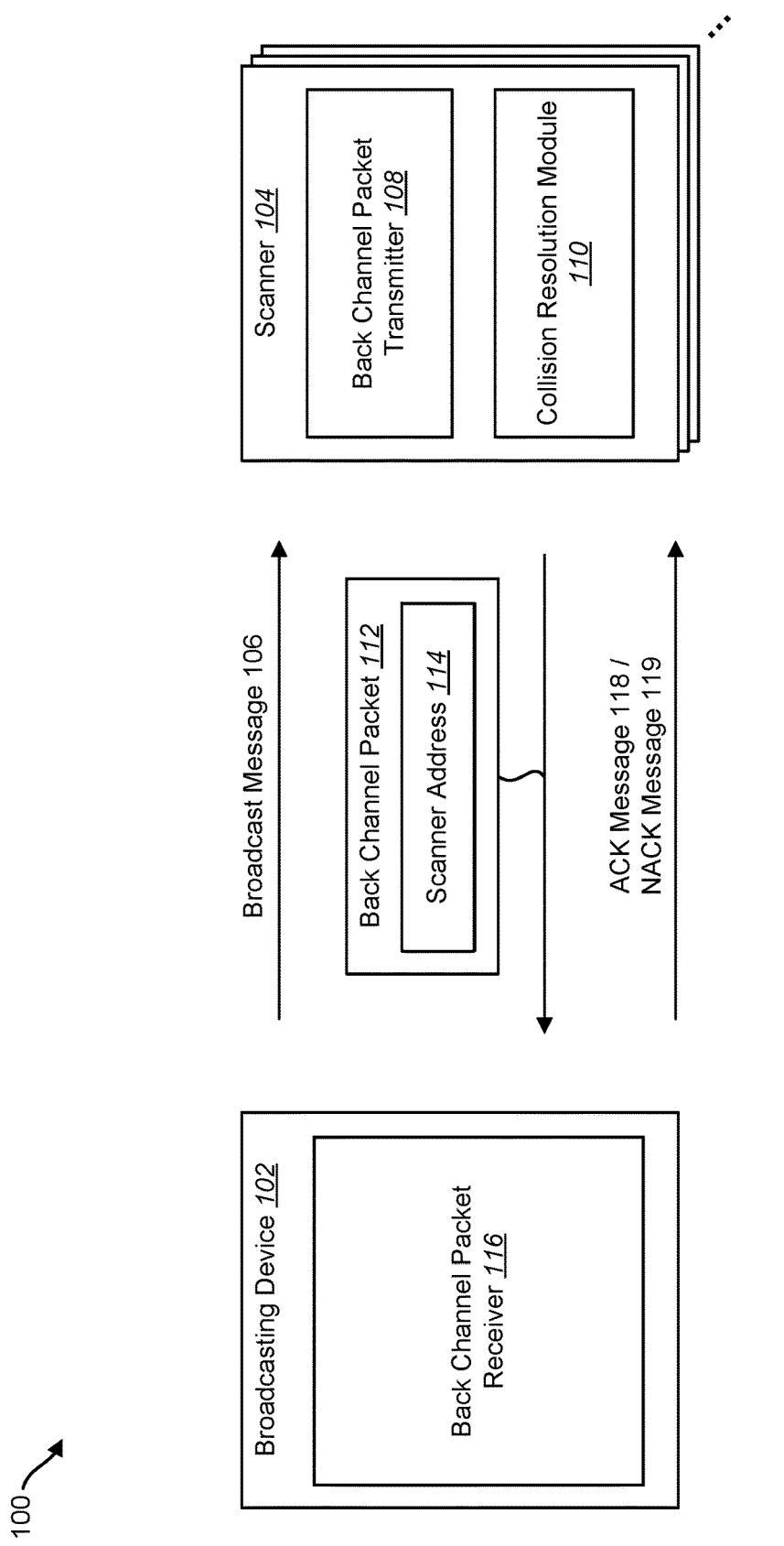
FIG. 1 is a block diagram illustrating a wireless communication system in which back channel communication from a scanner to a broadcasting device may be implemented.

The systems and methods disclosed herein may provide for back channel communication from a scanner to a broadcasting device. The systems and methods may be implemented in classic Bluetooth (e.g., Bluetooth BR/EDR) and Bluetooth low energy (BLE) communication. In Bluetooth and BLE, a broadcasting device may broadcast data to an unlimited number of scanners. However, there is currently no back channel communication from a scanner back to the broadcasting device in a connectionless mode.

The systems and methods described herein may be implemented on a variety of different electronic devices. Examples of electronic devices include general purpose or special purpose computing system environments or configurations, personal computers (PCs), server computers, handheld or laptop devices, multiprocessor systems, microprocessor-based systems, programmable consumer electronics, network PCs, minicomputers, mainframe computers, distributed computing environments that include any of the above systems or devices and the like. The systems and methods may also be implemented in mobile devices such as phones, smartphones, wireless headsets, personal digital assistants (PDAs), ultra-mobile personal computers (UM-PCs), mobile Internet devices (MIDs), etc. Further, the systems and methods may be implemented by battery-operated devices, sensors, etc. The following description refers to wireless communication devices for clarity and to facilitate explanation. Those of ordinary skill in the art will understand that a wireless communication device may comprise any of the devices described above as well as a multitude of other devices.

The Bluetooth wireless communication standard is typically employed for exchanging communications between fixed or mobile Bluetooth-enabled devices over short distances. In some configurations, the systems and methods disclosed herein may be applied to back channel communication between Bluetooth and BLE devices. LE refers to the "Low Energy" extension of the Bluetooth standard. The BLE extension is focused on energy-constrained applications such as battery-operated devices, sensor applications, etc. The following description uses terminology associated with the Bluetooth and BLE standards. Nevertheless, the concepts are applicable to other technologies and standards that involve modulating and transmitting digital data. Accordingly, while some of the description is provided in terms of Bluetooth standards, the systems and methods disclosed herein may be implemented more generally in wireless communication devices that may not conform to Bluetooth standards.

Various configurations are described with reference to the Figures, where like reference numbers may indicate functionally similar elements. The systems and methods as generally described and illustrated in the Figures could be arranged and designed in a wide variety of different configurations. Thus, the following more detailed description of several configurations, as represented in the Figures, is not intended to limit scope, but is merely representative.

FIG. 1 is a block diagram illustrating a wireless communication system 100 in which back channel communication from a scanner 104 to a broadcasting device 102 may be implemented. The wireless communication system 100 may include a broadcasting device 102 and one or more scanners 104. Wireless communication systems 100 are widely deployed to provide various types of communication content such as voice, data and so on. The broadcasting device 102 and the one or more scanners 104 are examples of wireless communication devices.

Although FIG. 1 depicts a broadcasting device 102 and a scanner 104, a wireless communication device may be capable of both transmitting and receiving. Thus, a single wireless communication device may comprise all of the components depicted in the broadcasting device 102 and the scanner 104. In addition, a wireless communication device may comprise other components not illustrated in FIG. 1. Those skilled in the art will understand that the wireless communication devices of FIG. 1 have been simplified to facilitate explanation.

Communications in the wireless communication system 100 may be achieved through transmissions over a wireless link. Such a wireless link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. In some configurations, the wireless communication system 100 may utilize MIMO. A MIMO system may support time division duplex (TDD) and/or frequency division duplex (FDD) systems.

In some configurations, the wireless communication system 100 may operate in accordance with one or more standards. Examples of these standards include Bluetooth (e.g., Institute of Electrical and Electronics Engineers (IEEE) 802.15.1), IEEE 802.11 (Wi-Fi), IEEE 802.16 (Worldwide Interoperability for Microwave Access (WiMAX), Global System for Mobile Communications (GSM), Universal Mobile Telecommunications System (UMTS), CDMA2000, Long Term Evolution (LTE), etc. Accordingly, the broadcasting device 102 may communicate with the scanner 104 using a communication protocol such as Bluetooth or Bluetooth low energy (BLE) in some configurations.

In some configurations, the wireless communication system 100 may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, evolution-data optimized (EV-DO), single-carrier frequency division multiple access (SC-FDMA) systems, General Packet Radio Service (GPRS) access network systems, 3rd Generation Partnership Project (3GPP) Long Term Evolution (LTE) systems, and spatial division multiple access (SDMA) systems.

In LTE and UMTS, a wireless communication device may be referred to as a "user equipment" (UE). In 3GPP Global System for Mobile Communications (GSM), a wireless communication device may be referred to as a "mobile station" (MS). The broadcasting device 102 and/or the scanner 104 may be referred to as and/or may include some or all of the functionality of a UE, MS, terminal, an access terminal, a subscriber unit, a station, etc. Examples of the broadcasting device 102 and/or the scanner 104 include cellular phones, smartphones, wireless headsets, wireless speakers, personal digital assistants (PDAs), wireless devices, electronic automobile consoles, gaming systems, wireless controllers, sensors, wireless modems, handheld devices, laptop computers, Session Initiation Protocol (SIP) phones, wireless local loop (WLL) stations, etc.

In Bluetooth communication, a broadcasting device 102 may send a broadcast message 106 to one or more scanners 104. The broadcast message 106 transmitted from the broadcasting device 102 to the one or more scanners 104 may be referred to as a forward channel.

In an implementation, a broadcasting device 102 may communicate with one or more scanners 104 using classic Bluetooth, which uses basic rate and enhanced data rate (BR/EDR). In classic Bluetooth, a broadcasting device 102 may be referred to as a master and a scanner 104 may be referred to as a slave. Classic Bluetooth has a feature called connectionless slave broadcast (CSB) that allows a master device to broadcast data to an unlimited number of slave devices. However, it does not provide a back channel from the slaves to the master. An example of a CSB broadcast is described in connection with FIG. 5.

In classic Bluetooth, sending data from a slave to the master requires establishing a point-to-point asynchronous connection-less (ACL) connection between the slave and master. However, the ACL connection takes up bandwidth and requires additional resources (e.g., memory, power) to maintain. Also, only 7 ACL connections can be active at any time, which puts a limit on the number of slaves within the network.

In another implementation, a broadcasting device 102 may communicate with one or more scanners 104 using BLE. One feature of BLE is periodic advertising. The broadcasting device 102 may perform periodic advertising. Periodic advertising may allow an unlimited number of scanners 104 to effectively synchronize to a given broadcasting device 102. A broadcasting device 102 may also be referred to as a periodic advertiser or advertiser.

In BLE, periodic advertising events are deterministic in terms of time and frequency, thus leading to power savings on a scanner 104 since they can turn on to listen for the broadcasting device 102 (i.e., advertiser) at a known and accurate time. This is compared to conventional advertising, which is not deterministic in nature.

With periodic advertising, the broadcasting device 102 may broadcast a broadcast message 106. The broadcasting device 102 may have some information to be broadcast at a defined interval. When the broadcasting device 102 sets up the broadcast, it defines the interval at which it is broadcasting. An example of periodic advertising is described in connection with FIG. 4.

It should be noted that in current approaches, periodic advertising, as with CSB, is uni-directional communication with no back channel from a scanner 104 to the broadcasting device 102. In current BLE approaches, scanners 104 need an ACL connection with the broadcasting device 102 in order to send data back to the broadcasting device 102. The BLE specifications allow a large number of BLE ACL connections to be active at the same time. However, there are practical limits to the number of active ACL connections due to memory and bandwidth constraints.

In an approach, Bluetooth devices may exchange messages in a connectionless mode in order to gain sufficient information to establish a connection. For example, connection formation may include one or more steps of inquiry, inquiry scanning, inquiry response and paging to discover and establish a connection. A master may send an inquiry message and a slave may send an inquiry response back to the master to provide information that allows the master to page the slave. Extended inquiry responses from the slave may provide additional information about the slave to the master. In an implementation, the master may provide additional inquiry-related information back to the slave(s) in a reverse extended inquiry response.

This inquiry message exchange may allow the master and slaves to gain information about whether to proceed with a page scan to form a connection. In other words, this inquiry message exchange is used to initiate a connection setup procedure between a master and slave.

However, it is beneficial in some circumstances for a scanner 104 to exchange information with the broadcasting device 102 while maintaining a connectionless relationship with the broadcasting device 102. For example, it may be desirable to broadcast data from the broadcasting device 102 to an indeterminate and unlimited number of scanners 104. In this scenario, it may be beneficial for the broadcasting device 102 and the scanners 104 to avoid establishing point-to-point asynchronous connection-less (ACL) connection or initiating a connection setup procedure. As described above, initiating, establishing and maintaining a connection utilizes resources and may limit the number of scanners 104 that can communicate with the broadcasting device 102.

In an example scenario, a broadcasting device 102 may be a television. The television may send out information to multiple battery-operated scanners 104 using periodic advertising. Occasionally, one of the scanners 104 may use the back channel to indicate to the television that its battery is getting low. The scanners 104 can also send their battery status to the broadcasting device 102 using this back channel periodically.

In the same example scenario, the scanner 104 may be a remote control. The remote control may send control information to the broadcasting device 102 on the back channel. For example, the remote control may send a back channel packet 112 instructing the television (i.e., the broadcasting device 102) to change the volume. In these scenarios, the scanners 104 may send occasional status or control information to the broadcasting device 102.

Another example is a mesh network of periodic advertisers that relay messages received by transmitting them as periodic advertising broadcast messages 106. The receiving devices (i.e., the scanners 104) may need to respond to these broadcast messages 106 and use the back channel to send messages (e.g., back channel packets 112) back to the relay devices.

The systems and methods described herein provide for back channel communication by a scanner 104 with a broadcasting device 102. The broadcasting device 102 may send a broadcast message 106. In one implementation, the broadcasting device 102 may perform periodic advertising using BLE protocols. This may be accomplished as described in connection with FIG. 4. In another implementation, the broadcasting device 102 may perform CSB using classic Bluetooth (e.g., BR/EDR) protocols, as described in connection with FIG. 5.

Upon receiving the broadcast message 106, the scanner 104 may be in a connectionless mode with respect to the broadcasting device 102. In this connectionless mode, the scanner 104 may receive the broadcast message 106 without having an established connection with the broadcasting device 102 or initiating a connection setup procedure with the broadcasting device 102. The broadcasting device 102 may also be in a connectionless mode with respect to the one or more scanners 104.

The scanner 104 may perform back channel communication with the broadcasting device 102 on a contention basis while maintaining the connectionless mode. The scanner 104 may include a back channel packet transmitter 108. The back channel packet transmitter 108 may broadcast a back channel packet 112 to the broadcasting device 102. The back channel packet 112 may contain control information and/or payload data.

In the case of BLE periodic advertising, the scanner 104 may send a back channel packet 112 to the broadcasting device 102 after the broadcasting device 102 packet (i.e., the broadcast message 106) on the same frequency. In an implementation, the scanner 104 may send the back channel packet 112 at a certain time (e.g., T_IFS) after the broadcast message 106.

In an implementation, the scanner 104 can simply send an AUX_ADV_IND packet that contains the scanner address 114 in the AdvA field. Also, the scanner 104 could also put the advertiser's address in the TargetA field.

The back channel packet 112 from the scanner 104 may contain a scanner address 114. In an implementation, the scanner address 114 may be the Bluetooth device address (BD_ADDR) of the scanner 104. The broadcasting device 102 may use the scanner address 114 to identify which device is trying to talk to it. In other words, because the scanner 104 sends the back channel packet 112 without a connection, the broadcasting device 102 may determine which specific scanner 104 sent the back channel packet 112 based on the included scanner address 114.

In an implementation, the back channel packet 112 may have a fixed length. This may aid the broadcasting device 102 in decoding the back channel packet 112 because the broadcasting device 102 would not have to determine whether a variable length back channel packet 112 is completely received.

In another implementation, the back channel packet 112 may have a variable length. In this implementation, a "maximum packet length" constraint may be used to limit the length of the back channel packet 112.

The broadcasting device 102 may listen for a back channel packet 112 sent by the scanner 104. In an implementation, the broadcasting device 102 may include a back channel packet receiver 116. The back channel packet receiver 116 may listen on the frequency used for the periodic advertising to detect a back channel packet 112 transmission. Upon receiving the back channel packet 112, the back channel packet receiver 116 may determine the scanner address 114 from the back channel packet 112.

The broadcasting device 102 may send an acknowledgment (ACK) message 118 or negative acknowledgement (NACK) message 119 on the periodic advertising frequency. If the broadcasting device 102 successfully receives the back channel packet 112, then the broadcasting device 102 may broadcast an ACK message 118. The broadcasting device 102 may include the scanner address 114 in the ACK message 118 to indicate to the scanner 104 that the broadcasting device 102 is responding to its back channel packet 112.

If the broadcasting device 102 fails to receive the back channel packet 112 (in the event of a collision, for instance), then the broadcasting device 102 may broadcast a NACK message 119. If the broadcasting device 102 is able to obtain the scanner address 114, then the broadcasting device 102 may include the scanner address 114 in the NACK message 119.

In an implementation, the broadcasting device 102 may send the ACK message 118 or NACK message 119 at a certain fixed time. This is because the broadcasting device 102 might not be able to tell the length of the back channel packet 112 in the case of a collision.

In the case of CSB, the scanner 104 may send a back channel packet 112 on the currently unutilized slave-to-master slot. As with periodic advertising, the back channel packet 112 of the scanner 104 (e.g., slave) may include the scanner address 114. In an implementation, the scanner address 114 may be the slave's Bluetooth device address (BD_ADDR). The broadcasting device 102 may use the scanner address 114 to determine which scanner 104 is talking to it.

In an implementation, the back channel packet 112 may be restricted to a single slot to simplify communications. This can be any ACL packet format. The first six octets of the back channel packets 112 may contain the scanner's Bluetooth device address.

In the CSB approach, if the broadcasting device 102 hears the back channel packet 112 successfully, the broadcasting device 102 may acknowledge the scanner 104 in the next master-to-slave transmission. For example, the broadcasting device 102 may send an ACK message 118 in the next master-to-slave transmission. The broadcasting device 102 may also include the scanner address 114 address in that packet. If the broadcasting device 102 does not successfully hear the back channel packet 112, the broadcasting device 102 may send a NACK message 119 in the next master-to-slave transmission.

For both the periodic advertising and CSB approaches, collisions between packets transmitted by scanners 104 may be resolved using a random backoff procedure. In an implementation, the scanner 104 may include a collision resolution module 110. In the event of a packet collision, the collision resolution module 110 may cause the scanner 104 to back off for a random period of time before retrying to send another back channel packet 112. The scanner 104 may start the random backoff procedure upon receiving a NACK message 119 from the broadcasting device 102. Additionally, the scanner 104 may start the random backoff procedure if it fails to receive an ACK message 118 from the broadcasting device 102 within a certain time period after sending the back channel packet 112.

In an implementation, the data throughput required from the scanner 104 to the broadcasting device 102 may be kept low to enhance the success of this contention-based random backoff scheme. For example, the back channel packet 112 may be sent on an infrequent or periodic basis. Furthermore, the data content of the back channel packet 112 may be limited in size (e.g., the back channel packet 112 may be a fixed length). Therefore, collisions may be minimized.

The systems and methods described herein will allow the scanner 104 to communicate with the broadcasting device 102 while remaining in a connectionless mode. The broadcasting device 102 may send broadcast messages 106 to an unrestricted number of scanners 104. A scanner 104 may perform back channel communication with the broadcasting device 102 via a back channel packet 112. This may reduce the bandwidth, memory and power requirements that a connection-oriented communication would require.

Figure 2:
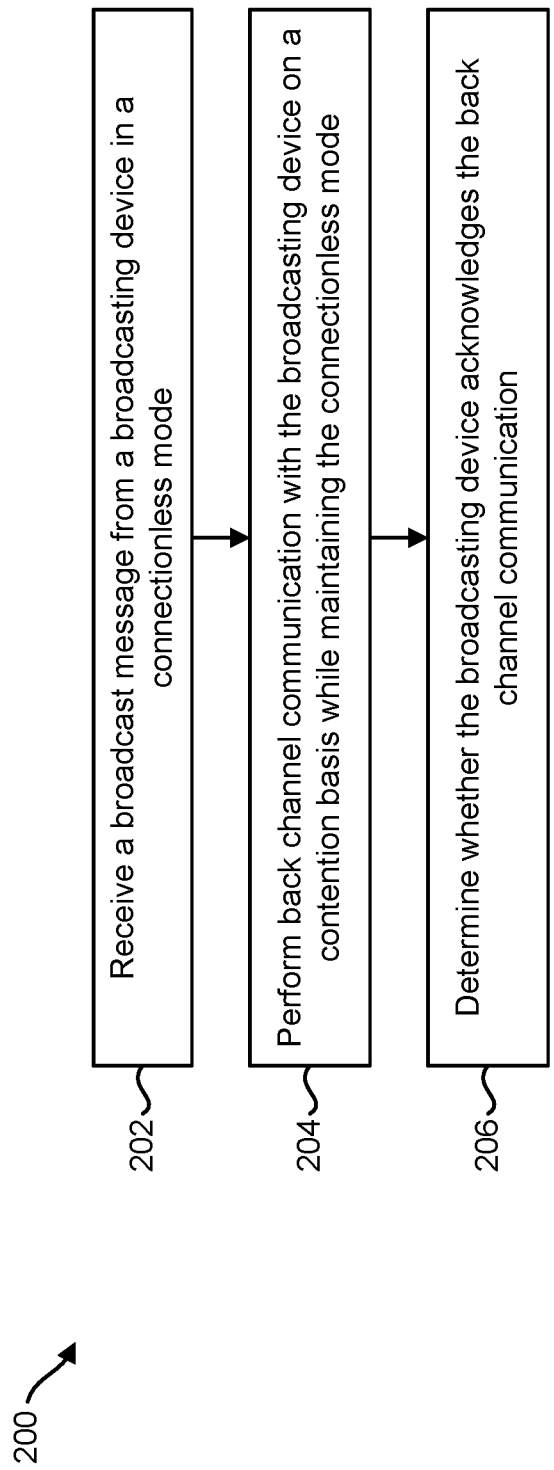
FIG. 2 is a flow diagram illustrating one configuration of a method for back channel communication.

FIG. 2 is a flow diagram illustrating one configuration of a method 200 for back channel communication. The method 200 may be performed by a scanner 104. In an implementation, the scanner 104 may be configured to communicate according to classic Bluetooth or Bluetooth low energy (BLE) protocols.

The scanner 104 may receive 202 a broadcast message 106 from a broadcasting device 102 in a connectionless mode. In an implementation, the broadcast message 106 may be a packet transmitted by the broadcasting device 102 in a BLE periodic advertising. In another implementation, the broadcast message 106 may be a packet transmitted by the broadcasting device 102 in a master-to-slave transmission of a Bluetooth connectionless slave broadcast (CSB) instant.

The scanner 104 may perform 204 back channel communication with the broadcasting device 102 on a contention basis while maintaining the connectionless mode. Performing 204 back channel communication in the connectionless mode may include the scanner 104 sending a packet (i.e., back channel packet 112) to the broadcasting device 102 without attempting to establish a point-to-point asynchronous connection-less (ACL) connection or initiating a connection setup procedure with the broadcasting device 102. In other words, the scanner 104 may send a back channel packet 112 to the broadcasting device 102 while maintaining a connectionless relationship with the broadcasting device 102.

In the case of BLE periodic advertising, the back channel communication occurs following a BLE periodic advertising by the broadcasting device 102. The scanner 104 may send a back channel packet 112 to the broadcasting device 102 on the same frequency as the periodic advertising at a certain time following the periodic advertising. In an implementation, the scanner 104 may send the back channel packet 112 at T_IFS after the periodic advertising.

In the case of Bluetooth CSB, the back channel communication occurs following a CSB instant. The scanner 104 may send a back channel packet 112 to the broadcasting device 102 in a slave-to-master slot following a master-to-slave transmission from the broadcasting device 102.

The back channel packet 112 may include a scanner address 114 with which the broadcasting device 102 can identify the scanner 104. For example, the scanner address 114 may be the Bluetooth device address (BD_ADDR) of the scanner 104.

The scanner 104 may determine 206 whether the broadcasting device 102 acknowledges the back channel communication. For example, the scanner 104 may receive a broadcast acknowledgment (ACK) message 118 from the broadcasting device 102 when the broadcasting device 102 successfully receives the back channel packet 112 sent in the back channel communication. Alternatively, the scanner 104 may receive a broadcast negative acknowledgment (NACK) message 119 from the broadcasting device 102 when the broadcasting device 102 fails to receive the back channel packet 112 sent in the back channel communication. In an implementation, the scanner 104 may consider a lack of an ACK message 118 within a certain time period as a NACK.

Figure 3:
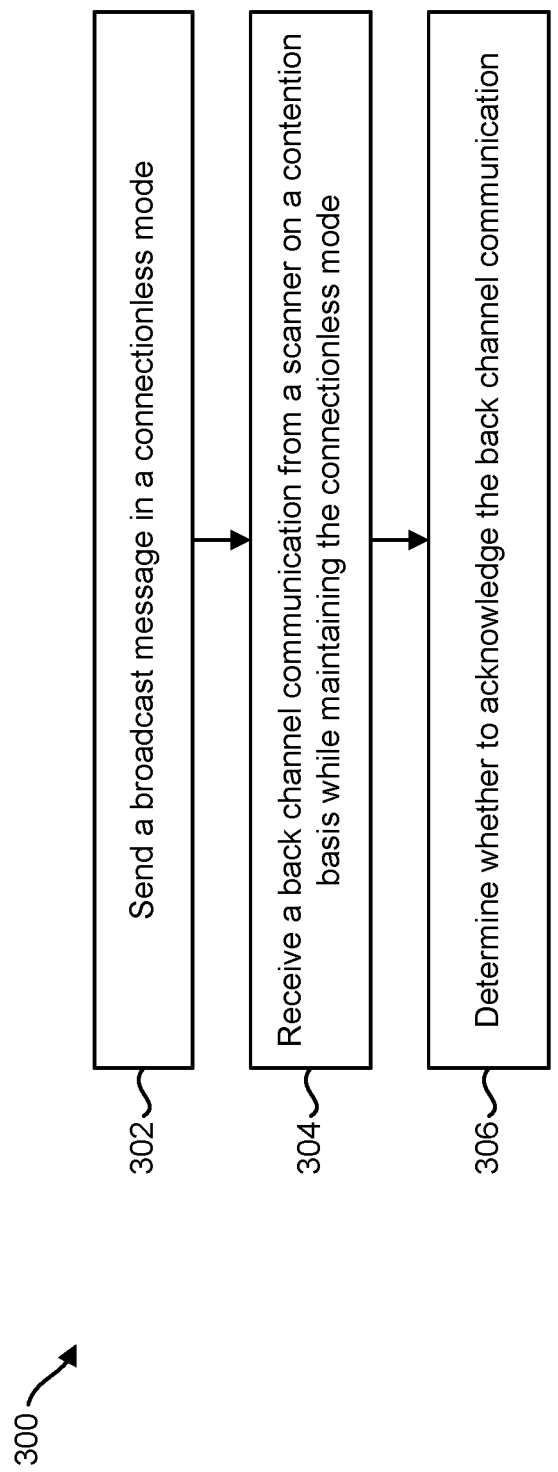
FIG. 3 is a flow diagram illustrating another method for back channel communication.

FIG. 3 is a flow diagram illustrating another method 300 for back channel communication. The method 300 may be performed by a broadcasting device 102. In an implementation, the broadcasting device 102 may be configured to communicate according to classic Bluetooth or Bluetooth low energy (BLE) protocols.

The broadcasting device 102 may send 302 a broadcast message 106 in a connectionless mode. In an implementation, the broadcast message 106 may be a packet transmitted by the broadcasting device 102 in a BLE periodic advertising. In another implementation, the broadcast message 106 may be a packet transmitted by the broadcasting device 102 in a master-to-slave transmission of a Bluetooth connectionless slave broadcast (CSB) instant.

The broadcasting device 102 may receive 304 a back channel communication from a scanner 104 on a contention basis while maintaining the connectionless mode. Receiving 304 the back channel communication in the connectionless mode may include the broadcasting device 102 receiving a packet (i.e., back channel packet 112) from the scanner 104 without attempting to establish a point-to-point asynchronous connection-less (ACL) connection or initiating a connection setup procedure with the scanner 104. In other words, the broadcasting device 102 may receive a back channel packet 112 from the scanner 104 while maintaining a connectionless relationship with the scanner 104.

In the case of BLE periodic advertising, the back channel communication may be received following a BLE periodic advertising by the broadcasting device 102. The broadcasting device 102 may receive a back channel packet 112 from the scanner 104 on the same frequency as the periodic advertising at a certain time following the periodic advertising. In an implementation, the broadcasting device 102 may receive the back channel packet 112 at T_IFS after the periodic advertising.

In the case of Bluetooth CSB, the back channel communication may be received following a CSB instant. The broadcasting device 102 may receive a back channel packet 112 from the scanner 104 in a slave-to-master slot following the master-to-slave transmission from the broadcasting device 102.

The back channel packet 112 may include a scanner address 114 with which the broadcasting device 102 can identify the scanner 104. For example, the scanner address 114 may be the Bluetooth device address (BD_ADDR) of the scanner 104.

The broadcasting device 102 may determine 306 whether to acknowledge the back channel communication. For example, the broadcasting device 102 may send a broadcast acknowledgment (ACK) message 118 to the scanner 104 when the broadcasting device 102 successfully receives the back channel packet 112 sent in the back channel communication. Alternatively, the broadcasting device 102 may send a broadcast negative acknowledgment (NACK) message 119 to the scanner 104 when the broadcasting device 102 fails to receive the back channel packet 112 sent in the back channel communication.

Figure 4:
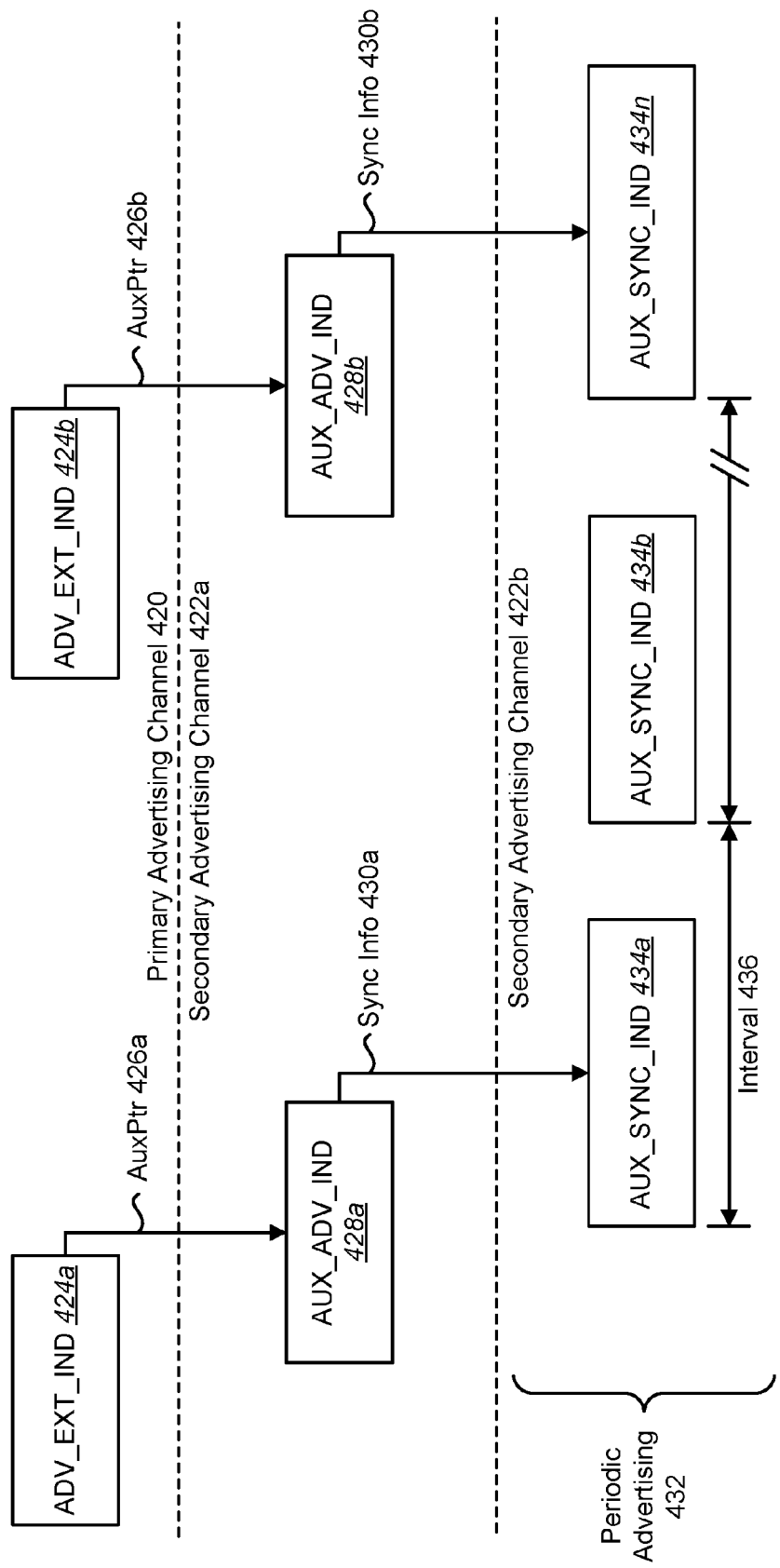
FIG. 4 is an example illustrating a Bluetooth low energy (BLE) periodic advertising scenario.

FIG. 4 is an example illustrating a BLE periodic advertising 432 scenario. A broadcasting device 102 may transmit an ADV_EXT_IND packet 424 in a primary advertising channel 420. The primary advertising channel 420 refers to the three advertising frequencies used in BLE. The primary advertising channel 420 may use one or more of three advertising PHY channels. The ADV_EXT_IND packet 424 may only be used in advertising events and only on the primary advertising channel 420. In this example, the broadcasting device 102 sends a first ADV_EXT_IND packet 424a followed by a second ADV_EXT_IND packet 424b at a later time.

A secondary advertising channel 422 may use the same physical (PHY) channels as the data channel. The secondary advertising channel 422 is the term to indicate the set of 37 frequencies used for other advertising packets. The ADV_EXT_IND packet 424 may point to an AUX_ADV_IND packet 428 using the AuxPtr field 426. The ADV_EXT_IND packet 424 may only be used on a secondary advertising channel 422a. In this example, the first ADV_EXT_IND packet 424a points to a first AUX_ADV_IND packet 428a via a first AuxPtr field 426a. The second ADV_EXT_IND packet 424b points to a second AUX_ADV_IND packet 428b via a second AuxPtr field 426b.

An AUX_SYNC_IND packet 434 is also used on the secondary advertising channel 422b. The secondary advertising channel 422b of the AUX_SYNC_IND packet 434 may be the same as or different than the secondary advertising channel 422a of the AUX_ADV_IND packet 428. The AUX_SYNC_IND packets 434 may be pointed to by AUX_ADV_IND packets 428 using a SyncInfo field 430. The SyncInfo field 430 may be used to describe a starting channel index, interval and hopping information. In this example, the first AUX_ADV_IND packet 428a may point to AUX_SYNC_IND packets 434a-b via SyncInfo field 430a. The second AUX_ADV_IND packet 428b may point to AUX_SYNC_IND packet 434n via SyncInfo field 430b.

AUX_SYNC_IND packets 434 may be used for periodic advertising 432. The AUX_SYNC_IND packets 434 may occur at a periodic and deterministic time in a similar manner to a data connection. AUX_SYNC_IND packets 434 may be transmitted in a deterministic interval 436 that follows the AFH channel map. The AUX_SYNC_IND packets 434 may be an implementation of the broadcast message 106 described in connection with FIG. 1.

In current BLE standards, AUX_SYNC_IND packets 434 differ from a connection in that they are unidirectional (e.g., broadcast) without acknowledgements. This allows an unlimited number of scanners 104 to receive the periodic broadcast. However, benefits may be realized with back channel communication from a scanner 104 back to the broadcasting device 102 while maintaining a connectionless mode, as described in connection with FIG. 1. Further examples of back channel communication according to the described systems and methods are described in connection with FIG. 6 and FIG. 7.

Figure 5:
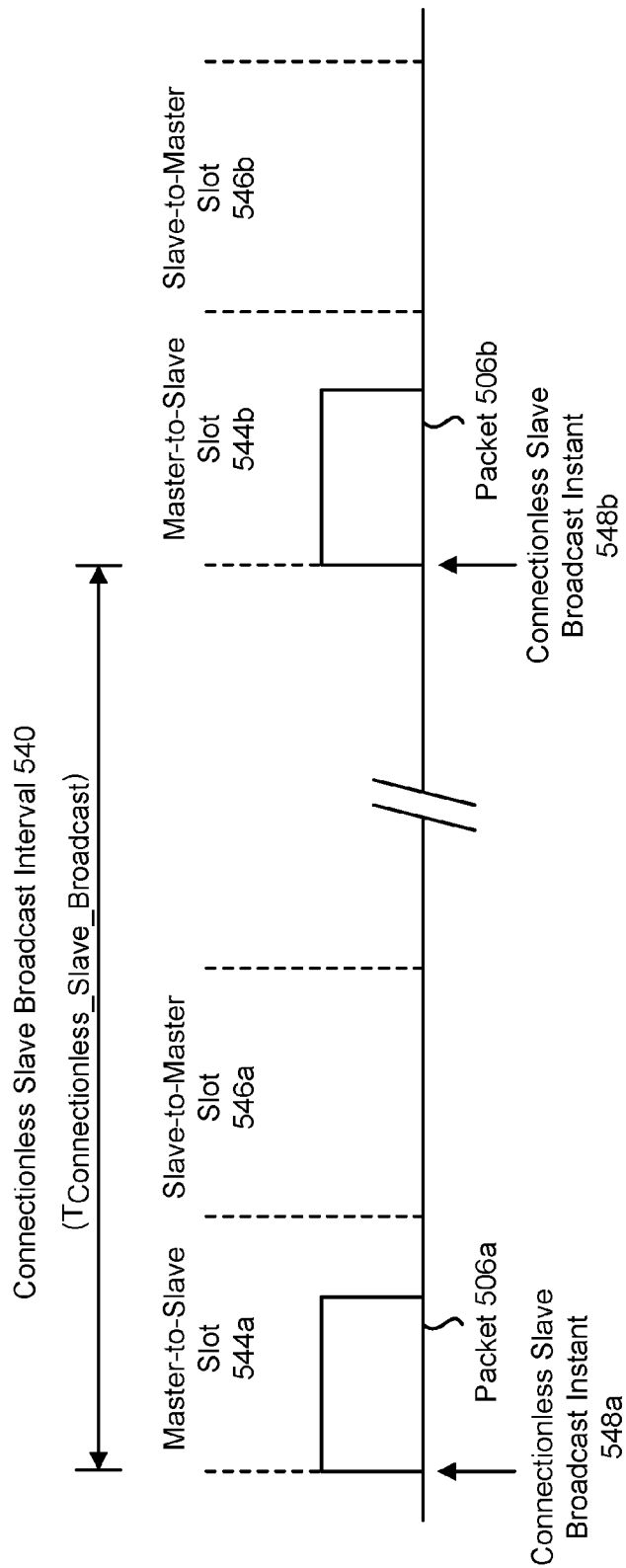
FIG. 5 is an example illustrating a Bluetooth connectionless slave broadcast (CSB) scenario.

FIG. 5 is an example illustrating a Bluetooth connectionless slave broadcast (CSB) scenario. CSB allows a broadcasting device 102 (i.e., master) to broadcast data to an unlimited number of scanners 104 (i.e., slaves).

At a first connectionless slave broadcast instant 548a, the broadcasting device 102 may broadcast a packet 506a (e.g., broadcast message 106) in a master-to-slave slot 544a. A slave-to-master slot 546a follows the master-to-slave slot 544a.

After a connectionless slave broadcast interval ($T_{Connectionless\_Slave\_Broadcast}$) 540, another connectionless slave broadcast instant 548b may begin. The broadcasting device 102 may broadcast another packet 506b in a master-to-slave slot 544b, which is followed by a slave-to-master slot 546b.

As with periodic advertising, current approaches to CSB lack a back channel from slave to master (i.e., scanner 104 to broadcasting device 102). It should be noted that the slave-to-master 546 slot following the master-to-slave slot 544 is currently unutilized.

Back channel communication from a scanner 104 back to the broadcasting device 102 may occur in a slave-to-master 546 slot following the master-to-slave slot 544 while maintaining a connectionless mode, as described in connection with FIG. 1. Further examples of back channel communication according to the described systems and methods are described in connection with FIG. 6 and FIG. 7.

Figure 6:
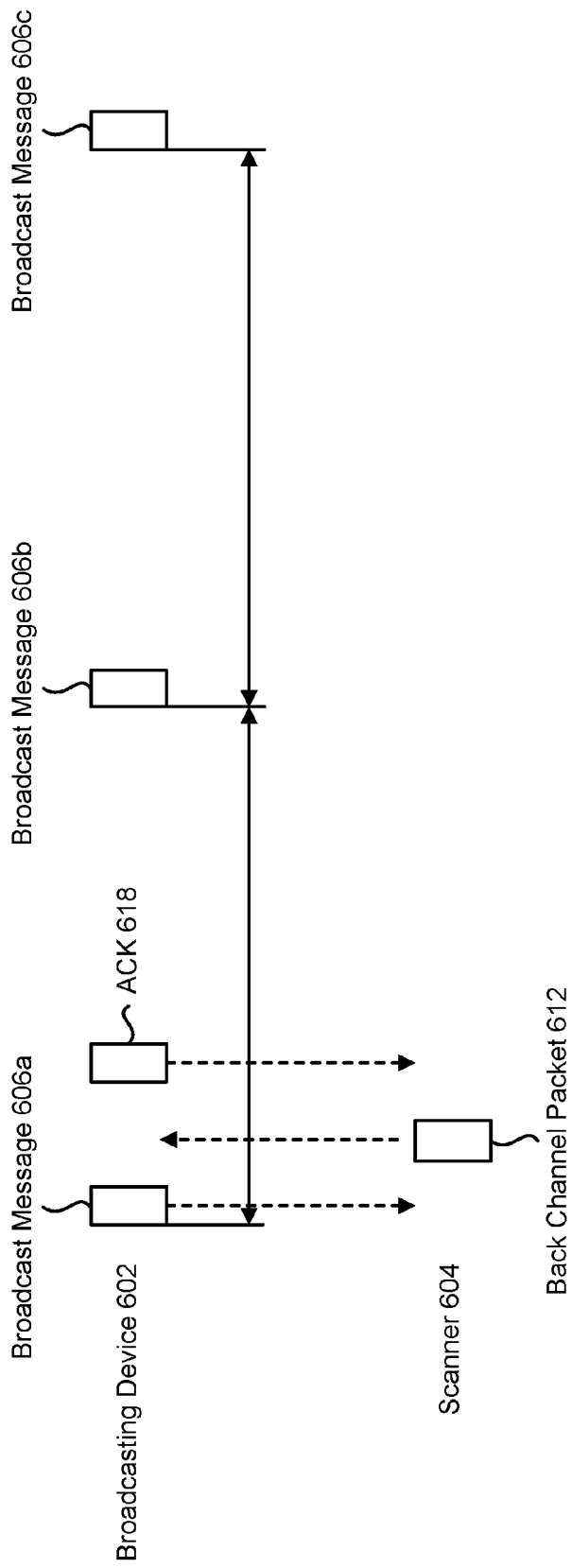
FIG. 6 is an example of back channel communication with no collision.

FIG. 6 is an example of back channel communication with no collision. In this example, a broadcasting device 602 may send periodic broadcast messages 606a-c. In an implementation, the broadcasting device 602 may be an advertiser performing BLE periodic advertising or a master performing CSB. A scanner 604 may be a scanner configured to receive BLE periodic advertising or a slave configured to receive CSB packets.

In this example, the broadcasting device 602 sends a broadcast message 606a. Upon receiving the broadcast message 606a, the scanner 604 sends a back channel packet 612. The back channel packet 612 may be broadcast with the scanner address 114 of the scanner 604, as described in connection with FIG. 1.

Upon receiving the back channel packet 612, the broadcasting device 602 may send an ACK message 618. The broadcasting device 602 may include the scanner address 114 of the scanner 604 to indicate that the ACK message 618 is directed to the scanner 604 and not another device. The scanner 604 receives the ACK message 618 from the broadcasting device 602 and determines that the back channel communication was received successfully.

Figure 7:
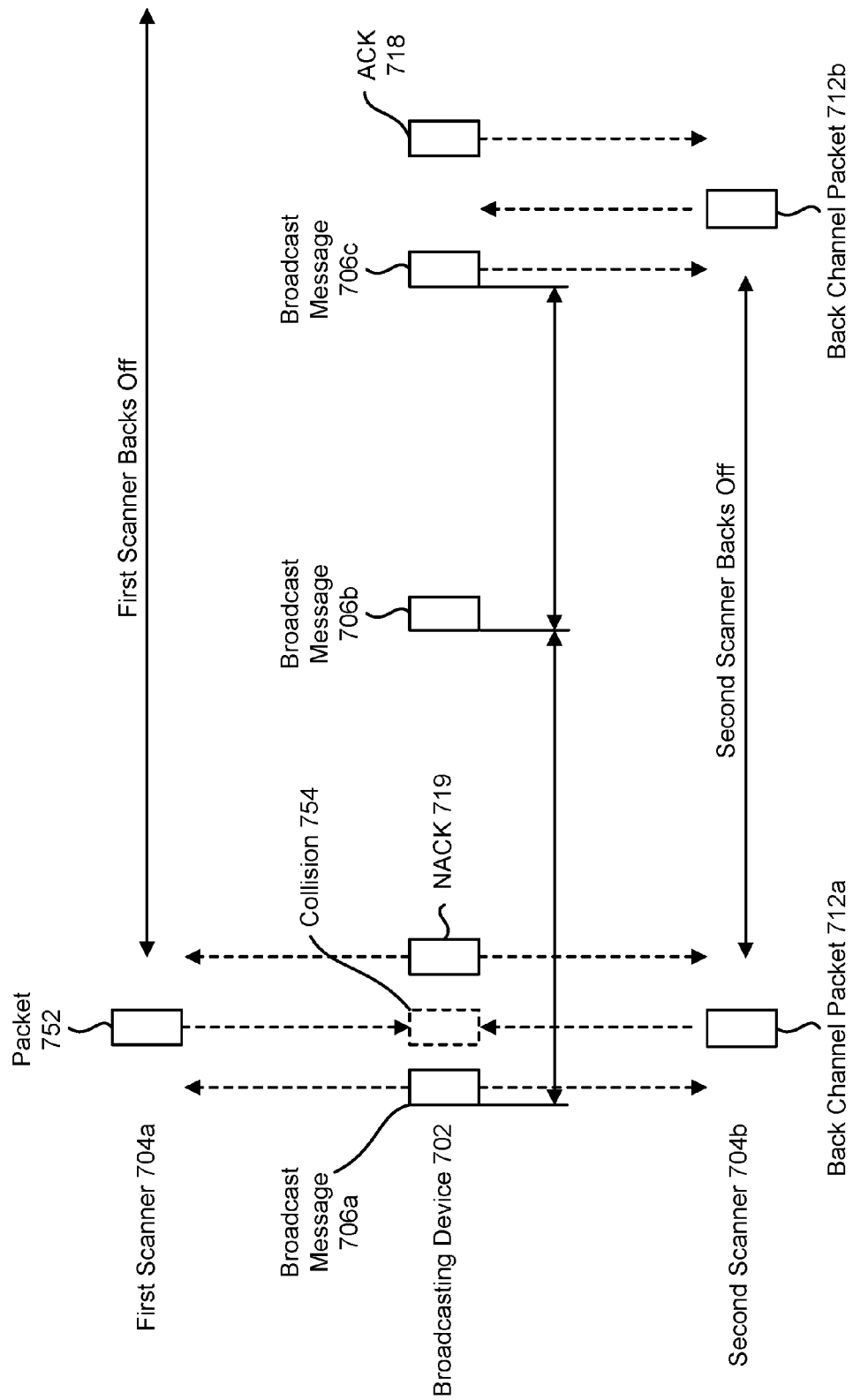
FIG. 7 is an example of back channel communication with a collision and resolution of the collision.

FIG. 7 is an example of back channel communication with a collision and resolution of the collision. In this example, a broadcasting device 702 may send broadcast messages 706a-c. In an implementation, the broadcasting device 702 may be an advertiser performing BLE periodic advertising or a master performing CSB. A first scanner 704a and a second scanner 704b may be configured to receive BLE periodic advertising or may be slave devices configured to receive CSB packets.

In this example, the broadcasting device 702 sends a broadcast message 706a. Upon receiving the broadcast message 706a, the second scanner 704b sends a back channel packet 712a. The back channel packet 712a may be broadcast with the scanner address 114 of the second scanner 704b, as described in connection with FIG. 1.

The first scanner 704a may also send a packet 752 following the broadcast message 706a that results in a collision 754 with the back channel packet 712a sent by the second scanner 704b. The packet 752 may be a back channel communication directed to the broadcasting device 702 or another communication.

Upon failing to successfully receive the back channel packet 712a because of the collision 754, the broadcasting device 702 may broadcast a NACK message 719. The broadcasting device 702 may include the scanner address 114 of the scanner 704 in the NACK message 719 if the broadcasting device 702 is able to obtain the scanner address 114. Alternatively, the broadcasting device 702 may send the NACK message 719 without a scanner address 114.

Upon receiving the broadcast NACK message 719, the first scanner 704a and the second scanner 704b may each perform a random backoff procedure. The first scanner 704a and the second scanner 704b back off for a random period of time. In this example, the first scanner 704a backs off for a longer period of time than the second scanner 704b. Upon expiration of the backoff period, the second scanner 704b is ready to attempt to perform back channel communication with the broadcasting device 702.

Upon receiving the broadcast message 706c from the broadcasting device 702, the second scanner 704b sends another back channel packet 712b. In this instance, the broadcasting device 702 receives the back channel packet 712b successfully. This may be due to the first scanner 704a still being in the backoff period. Upon successfully receiving the back channel packet 712b, the broadcasting device 702 may send an ACK message 718. The second scanner 704b receives the ACK message 718 from the broadcasting device 702 and determines that the back channel communication was received successfully.

Figure 8:
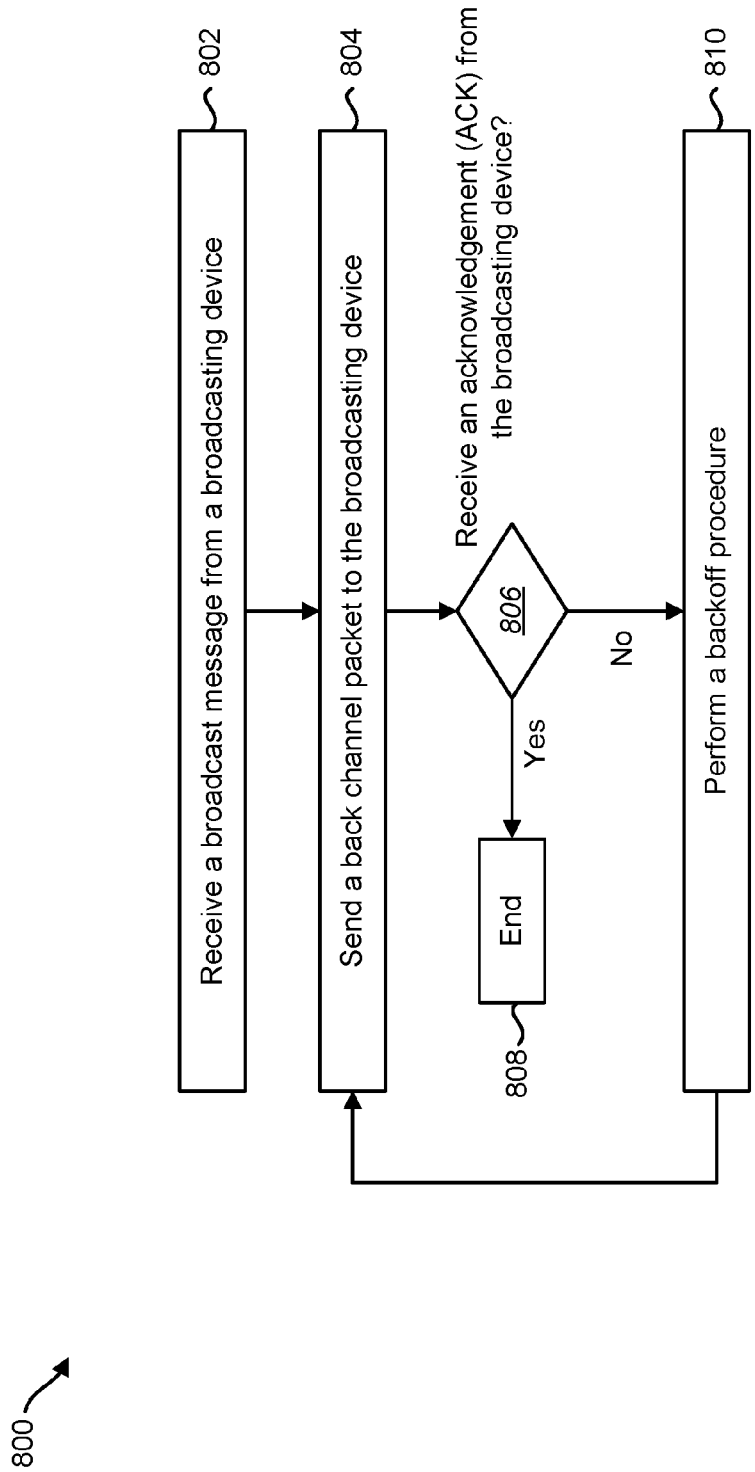
FIG. 8 is a flow diagram illustrating one configuration of a method for back channel communication by a scanner.

FIG. 8 is a flow diagram illustrating one configuration of a method 800 for back channel communication by a scanner 104. In an implementation, the scanner 104 may be configured to communicate according to classic Bluetooth or Bluetooth low energy (BLE) protocols.

The scanner 104 may receive 802 a broadcast message 106 from a broadcasting device 102 in a connectionless mode. This may be accomplished as described in connection with FIG. 2.

The scanner 104 may send 804 a back channel packet 112 to the broadcasting device 102. This may be done without attempting to establish a point-to-point asynchronous connection-less (ACL) connection or initiating a connection setup procedure with the broadcasting device. In other words, the scanner 104 may send 804 the back channel packet 112 to the broadcasting device 102 while maintaining a connectionless relationship with the broadcasting device 102. The back channel packet 112 may include a scanner address 114 with which the broadcasting device 102 can identify the scanner 104.

In the case of BLE periodic advertising, the scanner 104 sends 804 the back channel packet 112 following a BLE periodic advertising 432 by the broadcasting device 102. In the case of Bluetooth CSB, the scanner 104 sends 804 the back channel packet 112 in a slave-to-master slot 546 following a transmission in master-to-slave slot 544 from the broadcasting device 102.

The scanner 104 may determine 806 whether it received an ACK message 118 from the broadcasting device 102. If the scanner 104 receives an ACK message 118, this indicates that back channel packet 112 was received successfully and the method 800 ends 808.

If the scanner 104 does not receive an ACK message 118 (if the scanner 104 receives a NACK message 119 or no communication from the broadcasting device 102 within a certain time period, for example), then the scanner 104 may perform 810 a backoff procedure. The scanner 104 may wait a random period of time before resending 804 a back channel packet 112 to the broadcasting device 102.

Figure 9:
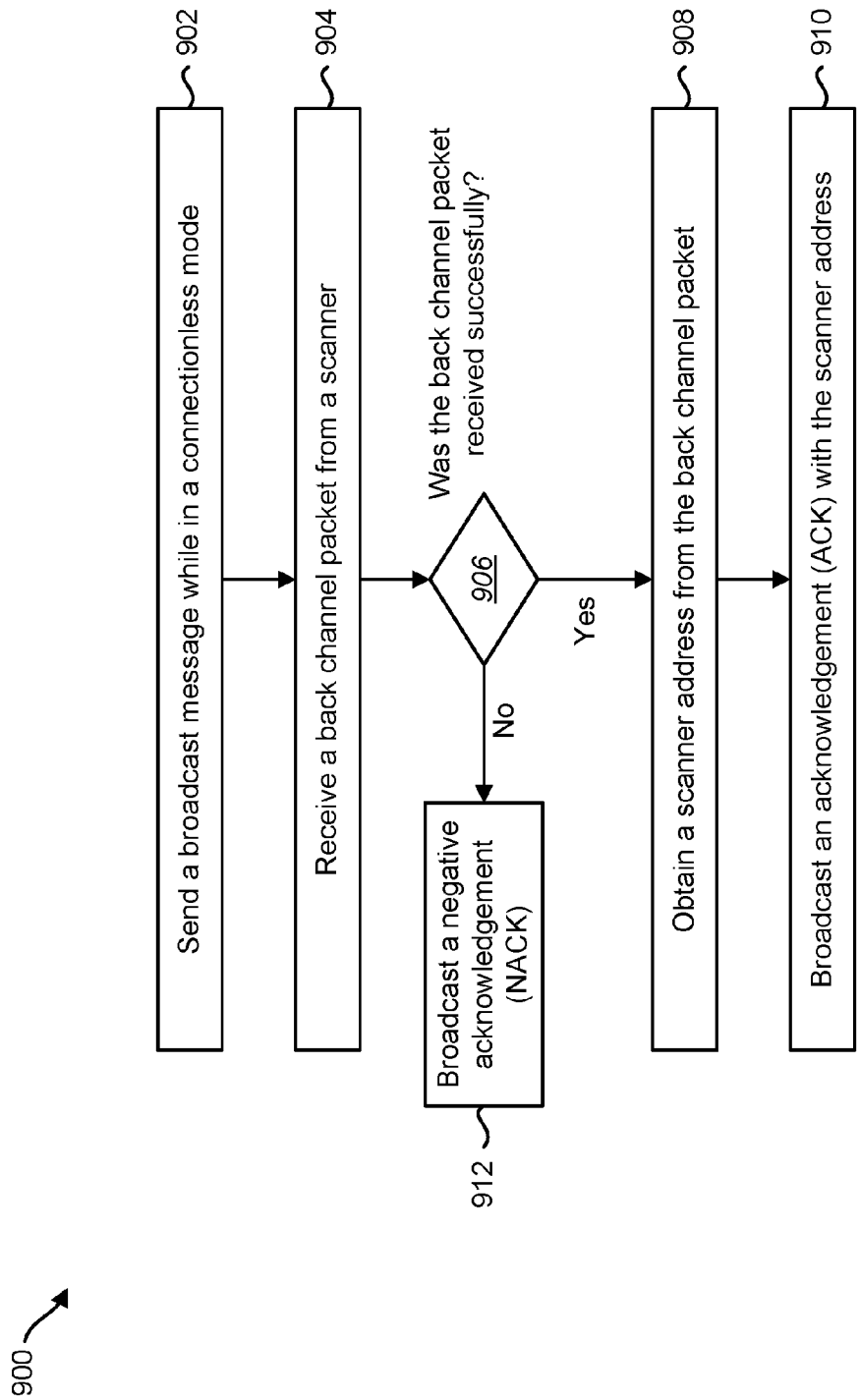
FIG. 9 is a flow diagram illustrating one configuration of a method for back channel communication by a broadcasting device.

FIG. 9 is a flow diagram illustrating one configuration of a method 900 for back channel communication by a broadcasting device 102. In an implementation, the broadcasting device 102 may be configured to communicate according to classic Bluetooth or Bluetooth low energy (BLE) protocols.

The broadcasting device 102 may send 902 a broadcast message 106. The broadcasting device 102 may be in a connectionless mode with respect to a scanner 104. In the case of BLE periodic advertising, the broadcasting device 102 may send an AUX_SYNC_IND packet 434 on a secondary advertising channel 422. In the case of CSB, the broadcasting device 102 may send a packet in a master-to-slave slot 544.

The broadcasting device 102 may receive 904 a back channel packet 112 from a scanner 104. In the case of BLE periodic advertising, the broadcasting device 102 may receive 904 the back channel packet 112 following a BLE periodic advertising 432 by the broadcasting device 102. In the case of Bluetooth CSB, the broadcasting device 102 may receive 904 the back channel packet 112 in a slave-to-master slot 546 following the transmission in the master-to-slave slot 544.

The broadcasting device 102 may determine 906 whether it received the back channel packet 112 successfully. If the back channel packet 112 was successfully received, then the broadcasting device 102 may obtain 908 the scanner address 114 of the scanner 104 from the back channel packet 112. The broadcasting device 102 may broadcast 910 an ACK message 118 with the scanner address 114 indicating that the back channel packet 112 was successfully received.

If the broadcasting device 102 determines 906 that it did not successfully receive the back channel packet 112, then the broadcasting device 102 may broadcast 912 a NACK message 119. The broadcasting device 102 may or may not include the scanner address 114 in the NACK message 119.

Figure 10:
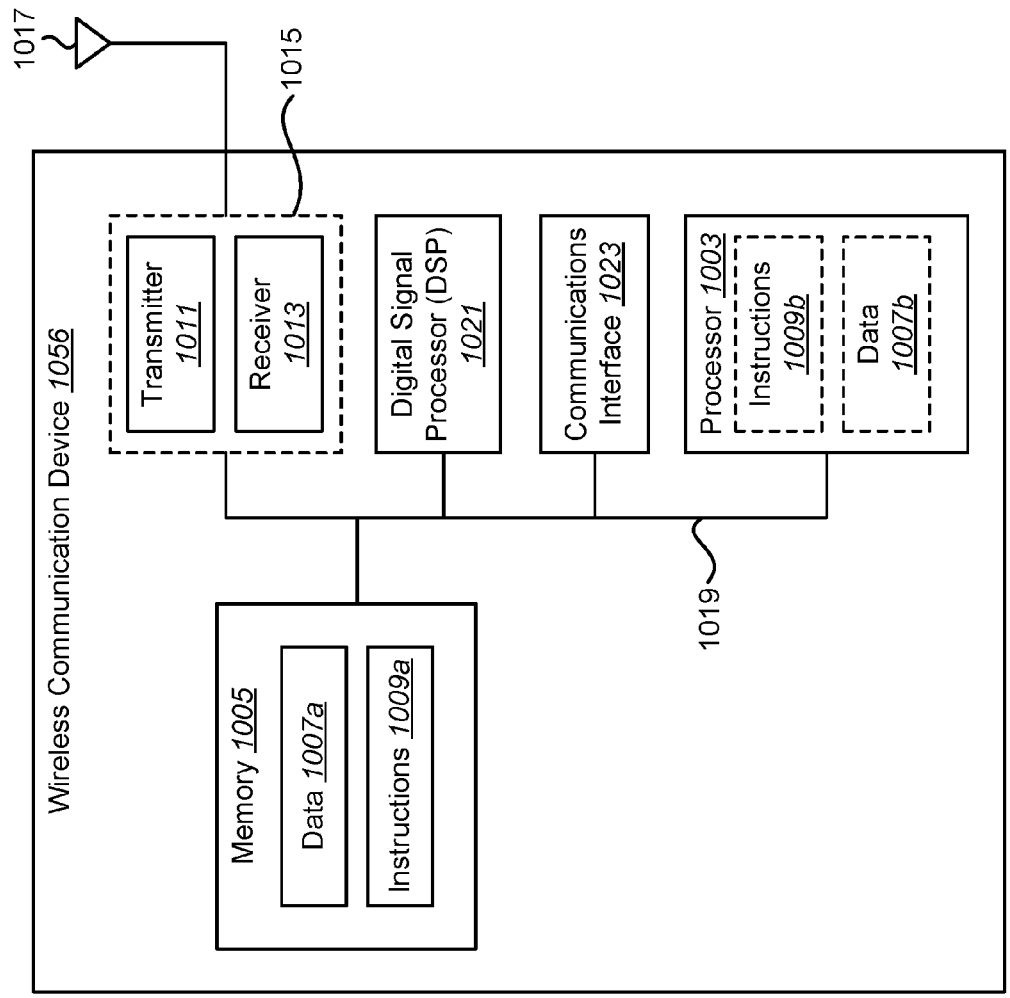
FIG. 10 illustrates certain components that may be included within a wireless communication device.

FIG. 10 illustrates certain components that may be included within a wireless communication device 1056. The wireless communication device 1056 described in connection with FIG. 10 may be an example of and/or may be implemented in accordance with the broadcasting device 102 or scanner 104 described in connection with one or more of FIGS. 1-9.

The wireless communication device 1056 includes a processor 1003. The processor 1003 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1003 may be referred to as a central processing unit (CPU). Although just a single processor 1003 is shown in the wireless communication device 1056 of FIG. 10, in an alternative configuration, a combination of processors (e.g., an ARM and DSP) could be used.

The wireless communication device 1056 also includes memory 1005 in electronic communication with the processor (i.e., the processor can read information from and/or write information to the memory). The memory 1005 may be any electronic component capable of storing electronic information. The memory 1005 may be configured as random access memory (RAM), read-only memory (ROM), magnetic disk storage media, optical storage media, flash memory devices in RAM, on-board memory included with the processor, Erasable Programmable Read-Only Memory (EPROM memory), Electrically Erasable Programmable Read-Only Memory (EEPROM memory), registers and so forth, including combinations thereof.

Data 1007a and instructions 1009a may be stored in the memory 1005. The instructions 1009a may include one or more programs, routines, sub-routines, functions, procedures, code, etc. The instructions 1009a may include a single computer-readable statement or many computer-readable statements. The instructions 1009a may be executable by the processor 1003 to implement the methods disclosed herein. Executing the instructions 1009a may involve the use of the data 1007a that is stored in the memory 1005. When the processor 1003 executes the instructions 1009, various portions of the instructions 1009b may be loaded onto the processor 1003, and various pieces of data 1007b may be loaded onto the processor 1003.

The wireless communication device 1056 may also include a transmitter 1011 and a receiver 1013 to allow transmission and reception of signals to and from the wireless communication device 1056 via an antenna 1017. The transmitter 1011 and receiver 1013 may be collectively referred to as a transceiver 1015. The wireless communication device 1056 may also include (not shown) multiple transmitters, multiple antennas, multiple receivers and/or multiple transceivers.

The wireless communication device 1056 may include a digital signal processor (DSP) 1021. The wireless communication device 1056 may also include a communications interface 1023. The communications interface 1023 may allow a user to interact with the wireless communication device 1056.

The various components of the wireless communication device 1056 may be coupled together by one or more buses, which may include a power bus, a control signal bus, a status signal bus, a data bus, etc. For the sake of clarity, the various buses are illustrated in FIG. 10 as a bus system 1019.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise Random-Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-Ray® disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for communication by a scanner, comprising:
    receiving a Bluetooth broadcast message from a broadcasting device in a connectionless mode; and
    performing back channel communication with the broadcasting device on a contention basis while maintaining the connectionless mode, wherein performing back channel communication in the connectionless mode comprises sending a Bluetooth packet to the broadcasting device without attempting to establish a point-to-point asynchronous connection-less (ACL) connection and without initiating a connection setup procedure with the broadcasting device.

2. The method of claim 1, wherein the back channel communication occurs following a Bluetooth low energy (BLE) periodic advertising by the broadcasting device.

3. The method of claim 1, wherein the back channel communication occurs following a Bluetooth connectionless slave broadcast (CSB) instant, wherein the scanner sends the Bluetooth packet to the broadcasting device in a slave-to-master slot following a master-to-slave transmission.

4. The method of claim 1, wherein the scanner sends the Bluetooth packet to the broadcasting device while maintaining a connectionless relationship with the broadcasting device.

5. The method of claim 1, wherein performing back channel communication comprises sending the Bluetooth packet with a scanner address with which the broadcasting device can identify the scanner.

6. The method of claim 1, further comprising:
    receiving a broadcast acknowledgment (ACK) message from the broadcasting device when the broadcasting device successfully receives the Bluetooth packet sent in the back channel communication.

7. The method of claim 1, further comprising:
    receiving a broadcast negative acknowledgment (NACK) message from the broadcasting device when the broadcasting device fails to successfully receive the Bluetooth packet sent in the back channel communication.

8. A scanner, comprising:
a processor;
a memory in electronic communication with the processor; and
instructions stored in the memory, the instructions executable by the processor to:
receive a Bluetooth broadcast message from a broadcasting device in a connectionless mode; and
perform back channel communication with the broadcasting device on a contention basis while maintaining the connectionless mode, wherein performing back channel communication in the connectionless mode comprises sending a Bluetooth packet to the broadcasting device without attempting to establish a point-to-point asynchronous connection-less (ACL) connection and without initiating a connection setup procedure with the broadcasting device.

9. The scanner of claim 8, wherein the back channel communication occurs following a Bluetooth low energy (BLE) periodic advertising by the broadcasting device.

10. The scanner of claim 8, wherein the back channel communication occurs following a Bluetooth connectionless slave broadcast (CSB) instant, wherein the scanner sends the Bluetooth packet to the broadcasting device in a slave-to-master slot following a master-to-slave transmission.

11. The scanner of claim 8, wherein the instructions executable to perform back channel communication comprise instructions executable to send the Bluetooth packet with a scanner address with which the broadcasting device can identify the scanner.

12. The scanner of claim 8, further comprising instructions executable to:
receive a broadcast acknowledgment (ACK) message from the broadcasting device when the broadcasting device successfully receives the Bluetooth packet sent in the back channel communication.

13. The scanner of claim 8, further comprising instructions executable to:
receive a broadcast negative acknowledgment (NACK) message from the broadcasting device when the broadcasting device fails to successfully receive the Bluetooth packet sent in the back channel communication.

14. A method for communication by a broadcasting device, comprising:
sending a Bluetooth broadcast message from the broadcasting device in a connectionless mode; and
receiving a back channel communication from a scanner on a contention basis while maintaining the connectionless mode with respect to the scanner, wherein receiving the back channel communication in the connectionless mode comprises receiving a Bluetooth packet from the scanner without attempting to establish a point-to-point asynchronous connection-less (ACL) connection and without initiating a connection setup procedure with the scanner.

15. The method of claim 14, wherein the back channel communication is received following a Bluetooth low energy (BLE) periodic advertising by the broadcasting device.

16. The method of claim 14, wherein the back channel communication is received following a Bluetooth connectionless slave broadcast (CSB) instant, wherein the scanner sends the Bluetooth packet to the broadcasting device in a slave-to-master slot following a master-to-slave transmission.

17. The method of claim 14, wherein the broadcasting device receives the Bluetooth packet from the scanner while maintaining a connectionless relationship with the scanner.

18. The method of claim 14, wherein receiving the back channel communication comprises:
receiving the Bluetooth packet with a scanner address; and
identifying the scanner based on the scanner address.

19. The method of claim 14, further comprising:
sending a broadcast acknowledgment (ACK) message addressed to the scanner when the broadcasting device successfully receives the Bluetooth packet in the back channel communication.

20. The method of claim 14, further comprising:
sending a broadcast negative acknowledgment (NACK) message to the scanner when the broadcasting device fails to successfully receive the Bluetooth packet in the back channel communication.

21. A broadcasting device, comprising:
a processor;
a memory in electronic communication with the processor; and
instructions stored in the memory, the instructions executable by the processor to:
send a Bluetooth broadcast message from the broadcasting device in a connectionless mode; and
receive a back channel communication from a scanner on a contention basis while maintaining the connectionless mode with respect to the scanner, wherein receiving the back channel communication in the connectionless mode comprises receiving a Bluetooth packet from the scanner without attempting to establish a point-to-point asynchronous connection-less (ACL) connection and without initiating a connection setup procedure with the scanner.

22. The broadcasting device of claim 21, wherein the back channel communication is received following a Bluetooth low energy (BLE) periodic advertising by the broadcasting device.

23. The broadcasting device of claim 21, wherein the back channel communication is received following a Bluetooth connectionless slave broadcast (CSB) instant, wherein the scanner sends the Bluetooth packet to the broadcasting device in a slave-to-master slot following a master-to-slave transmission.

24. The broadcasting device of claim 21, wherein the instructions executable to receive the back channel communication comprise instructions executable to:
receive the Bluetooth packet with a scanner address; and
identify the scanner based on the scanner address.

25. The broadcasting device of claim 21, further comprising instructions executable to:
send a broadcast acknowledgment (ACK) message addressed to the scanner when the broadcasting device successfully receives the Bluetooth packet in the back channel communication.

26. The broadcasting device of claim 21, further comprising instructions executable to:
send a broadcast negative acknowledgment (NACK) message to the scanner when the broadcasting device fails to successfully receive the Bluetooth packet in the back channel communication.

* * * * *